United States Patent [19]

Burt

[11] 4,312,610
[45] Jan. 26, 1982

[54] SHEET MATERIAL CUTTING DEVICE

[75] Inventor: Arthur D. Burt, Watsonia, Australia

[73] Assignee: McPherson's Limited, Melbourne, Australia

[21] Appl. No.: 57,356

[22] Filed: Jul. 13, 1979

[30] Foreign Application Priority Data

Jul. 21, 1978 [AU] Australia .............................. PD5166
Mar. 15, 1979 [AU] Australia .............................. PD8037

[51] Int. Cl.³ ...................... B23B 45/16; B23D 27/02
[52] U.S. Cl. ......................................... 408/26; 7/158;
  29/26 B; 30/123; 30/500; 83/916; 408/30
[58] Field of Search .............. 29/26 A, 26 B; 408/26,
  408/22, 30, 115, 79, 28; 409/179; 83/916;
  30/122, 123, 240, 241, 500; 145/130; 7/158;
  173/48

[56] References Cited

U.S. PATENT DOCUMENTS

| 2,670,637 | 3/1954 | Whitechester | 408/79 |
| 2,693,134 | 11/1954 | Mole | 409/179 |
| 3,292,494 | 12/1966 | Anderson et al. | 409/179 |
| 3,340,610 | 9/1967 | Hendrickson | 30/123 R |
| 3,412,466 | 11/1968 | Kurosaki | 30/123 X |

Primary Examiner—Z. R. Bilinsky
Attorney, Agent, or Firm—Schuyler, Banner, Birch, McKie & Beckett

[57] ABSTRACT

A generally portable sheet material cutting tool comprising apparatus having a substantially stationary sleeve member with a free end and a cutting tool reciprocable within the sleeve member, the cutting tool having both a transverse cutting edge formed along its length cooperable with the free end of the sleeve member and an initial hole forming means extending beyond the free end of the sleeve member. The reciprocation of the cutting tool is effected by cam means acting in response to rotary motion supplied by a hand held drill unit or by a rotary drive motor, the cam means being capable of being disengaged by axial pressure applied to the initial hole forming means. In one form of the apparatus the transverse cutting edge is given both a reciprocating and a rotating component of motion, and in a modified form of the apparatus the transverse cutting edge is restrained for reciprocating movement only.

19 Claims, 23 Drawing Figures

SHEET MATERIAL CUTTING DEVICE

The present invention generally relates to apparatus for cutting sheet material and is particularly concerned with apparatus for cutting holes or apertures of any desired configuration within sheet material.

There are many areas where it is necessary to cut an aperture in sheet material and often these tasks are required to be carried out on site where heavy cutting machinery is not available. Furthermore, such tasks are often required to be carried out only once and special cutting machinery is generally inappropriate. Typical applications where this is the case include cutting holes in spouting for downpipes; cutting shapes for intersecting duct work in air conditioning and dust extraction equipment; cutting out various shapes in gasket materials; cutting holes in panels for mounting instruments, switches and the like; cutting holes and trimming profiles in corrugated iron associated with roofing, tanks, storage bins and the like; and other general sheet metal work. Quite often the sheet material involved is quite heavy gauge which makes it very difficult to cut by using conventional manually operated shears. In quite a number of applications the work area or the nature or configuration of the hole to be cut makes it virtually impossible to create the hole by manipulating conventional shears. In addition to the foregoing, where the hole to be cut is totally enclosed within the sheet material, it is usually necessary to drill at least one and possibly quite a number of starting holes before manipulating conventional shears.

It will be appreciated from the foregoing that conventionally it has been necessary to use two different tools and quite often even these tools have proved difficult to use efficiently. There have been a number of proposals for so called "nibbling" tools wherein a reciprocating cutting element operates generally laterally relative to sheet material and successively shears small chips from an edge region of the sheet material thereby forming a slot cut in the sheet material. A typical example of this type of nibbling tool is disclosed in U.S. Pat. No. 3,942,250. The applicability of these types of tools to sheet metal cutting has been quite restricted due to the fact that they do not provide any means for cutting holes which are completely enclosed by sheet metal and in addition the supporting structure located beneath the reciprocating cutting element restricts to a significant extent the freedom of movement of the tool.

The objective of the present invention is to provide apparatus capable of cutting holes of any desired configuration in sheet material without the need of any preliminary preparation steps by other tools. Particularly, the present invention aims at providing apparatus capable of cutting totally enclosed holes of any desired configuration in sheet material.

A preferred objective of the present invention is to provide an attachment for a conventional portable hand held drill unit capable of achieving the aforementioned aims.

Accordingly the present invention provides apparatus for cutting sheet material comprising a pair of relatively reciprocable members wherein one of said members includes a cutting edge transverse to the direction of reciprocation and co-operable with the other of said pair of relatively reciprocable members whereby said cutting edge engages with an edge of said sheet material to remove material therefrom; and hole cutting means associated with one of said relatively reciprocable members being rotatable for creating an initial opening in said sheet material.

Conveniently one of said pair of relatively reciprocable members is formed as a sleeve member and is held substantially stationary, the other of said pair of relatively reciprocable members being adapted to reciprocate within said substantially stationary sleeve member, said other member having a recess formed in its outer periphery to provide said cutting edge, and said cutting edge co-operating with a free end region of said stationary sleeve member to effect removal of material from a sheet material edge.

In accordance with one preferred arrangement the apparatus according to the present invention is formed as an attachment for a rotary drill unit, the apparatus having a drill shaft receivable with the jaws of the drill chuck. It, should, however, be appreciated that the apparatus may also be formed as an independent unit having its own rotary drive means which may be connectable to a power supply.

In another preferred embodiment, the aforesaid other member may be a second sleeve mounted on a rotatable shaft, and said hole cutting means may comprise a drill point on the rotatable shaft extending beyond the free end region of the stationary sleeve member.

In a further preferred embodiment, the aforesaid other member may be rotatable and the hole cutting means may be formed as a drill point thereon extending beyond the free end region of the sleeve member.

Apparatus in accordance with the present invention is particularly suitable for cutting sheet metal, however other materials such as plastics, gasket materials and the like may also be cut by the apparatus.

A particularly preferred aspect of the present invention provides an apparatus for cutting sheet material comprising:

(a) a drive shaft adapted for connection with drive means whereby said drive shaft is rotatable, (b) a cutting tool holder connected for rotation with said drive shaft but being axially slidable relative thereto, said cutting tool holder being adapted to releasably secure a cutting tool for movement with said holder, said cutting tool having an elongated shank, a drill point at a free end of said shank and a recess formed in the periphery of said shank forming at least one transverse cutting edge axially spaced from the drill point.

(c) a sleeve member having an axially extending bore adapted to receive said cutting tool such that the drill point extends beyond a free end region of said sleeve member, and said sleeve member being adapted to be held substantially stationary relative to said tool holder;

(d) cam means operable between said sleeve member and said tool holder to effect reciprocation of said holder upon rotation thereof whereby said cutting edge or edges reciprocate past the free end region of the sleeve member; and (e) resilient biasing means urging said cam means into interengagement but enabling disengagement of said cam means upon a predetermined axial load being applied to the drill point of said cutting tool whereby said drill point is adapted for rotation without axial reciprocation.

Another preferred aspect of the present invention provides an apparatus for cutting sheet material comprising:

(a) a drive shaft adapted for connection with drive means whereby said drive shaft is rotatable;

(b) cutting tool means arranged for sliding movement relative to said drive shaft between a first position where said cutting tool means is rotatable without reciprocation with said drive shaft and a second position where said cutting tool means is disengaged from rotation for reciprocation only with said drive shaft said cutting tool means having an elongated shank region, a drill point at a free end of said shank region and a recess formed in the periphery of said shank region forming at least one transverse cutting edge axially spaced from the drill point (c) a sleeve member having an axially extending bore adapted to receive the shank region of said cutting tool means such that the drill point extends beyond a free end region of said sleeve member, said sleeve member being adapted to be held substantially stationary relative to said cutting tool means, (d) cam means operable between said drive shaft and said cutting tool means to effect reciprocation of said cutting tool means upon rotation of said drive shaft (e) positive engagement surfaces co-operable between said sleeve member and said cutting tool means being operable, when engaged, to restrain said cutting tool means for axial reciprocation without rotation relative to said sleeve member, and (f) resilient biasing means urging said cam means and said positive engagement surfaces into interengagement but enabling disengagement of said cam means and said positive engagement surfaces upon a predetermined axial load being applied to the drill point of said cutting tool means whereby said cutting tool means is movable to said first position. It should be appreciated that the aforesaid cutting tool means may comprise a two piece unit consisting of a tool holder and a cutting tool, the tool holder including means for securing the cutting tool thereto.

Further preferred features and characteristics of the present invention will become apparent from the following description of a number of preferred embodiments thereof given in relation to the accompanying drawings. In the drawings.

Figures 1, 1A, 13, 14:
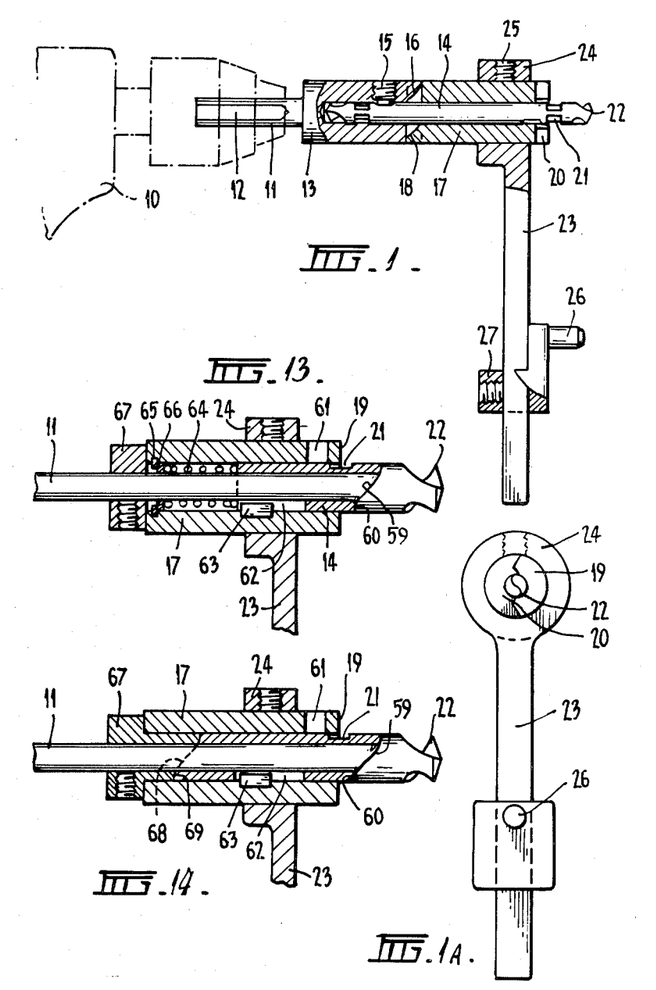
FIG. 1 is a side elevation and partly sectioned view of a first preferred embodiment according to the present invention.
FIG. 1A is an end elevation view of the arrangement illustrated in FIG. 1.
FIG. 13 is a side elevation and partly sectioned view of a third preferred embodiment according to the present invention.
FIG. 14 is a side elevation and partly sectioned view of a fourth preferred embodiment according to the present invention.

Referring first to FIG. 1, a conventional drill unit 10 is shown in phantom which includes a chuck with jaws: The drill unit 10 is preferably a hand held pistol grip portable unit. A drive shaft 11 is releasably secured within the jaws of the drill chuck and includes three longitudinal flats 12 to aid gripping in the jaws of the drill chuck. The drive shaft 11 extends into a cylindrical holder 13 adapted to receive a drill pointed cutting element 14. A set screw 15 is arranged to secure the cutting element 14 in the holder 13. The free end of the cylindrical holder 13 includes an annular cam face 16.

The arrangement illustrated in FIG. 1 also includes a generally cylindrical shearing sleeve 17 arranged such that that it surrounds the cutting element 14 and permits the cutting element to slide and rotate therein. One end of the shearing sleeve 17 has an annular cam face 18 in engagement with the cam face 16 on the cylindrical holder 13. The other end of the shearing sleeve 17 includes a shearing face 19 with a chip clearance notch 20. The drill pointed cutting element 14 includes a shearing slot 21 arranged a short distance from the drill point 22.

In operation the cam face of the shearing sleeve 17 may be manually disengaged from the holder 13 to enable an initial hole to be drilled in sheet material by the drill point 22 without reciprocation thereof. Subsequently the shearing sleeve 17 is maintained substantially stationary and the cam faces 16 and 18 are mutually engaged by manual pressure on the pistol grip drill to impose on the cutting element 14, a reciprocating motion together with its rotary motion. As a result of this, the shearing slot 21 co-operates with the shearing face 19 to shear small chips from the edge of the initially drilled hole in the sheet material to cut a slot of any required direction. To hold the shearing sleeve 17 stationary, a steering arm 23 with an integral collar 24 is provided whereby the collar 24 is fixed to the shearing sleeve 17 by means of a set screw 25. The steering arm 23 may either be manually gripped by an operator, or alternatively, a variable radius locating pin 26 may be provided to enable circular openings to be cut in sheet material. The locating pin 26 may be located in a drilled hole in the sheet material and the arm 23 acts as a radius member. The pin 26 may be moved along the arm 23 and set in a selected position by means of a set screw 27.

The previously described arrangement is extremely simple in construction and operation, however, it does suffer from the disadvantage that the entire assembly, including the pistol grip drill, tends to reciprocate when in the nibbling (or slot cutting) mode of operation.

Figures 2, 2A, 3, 4:
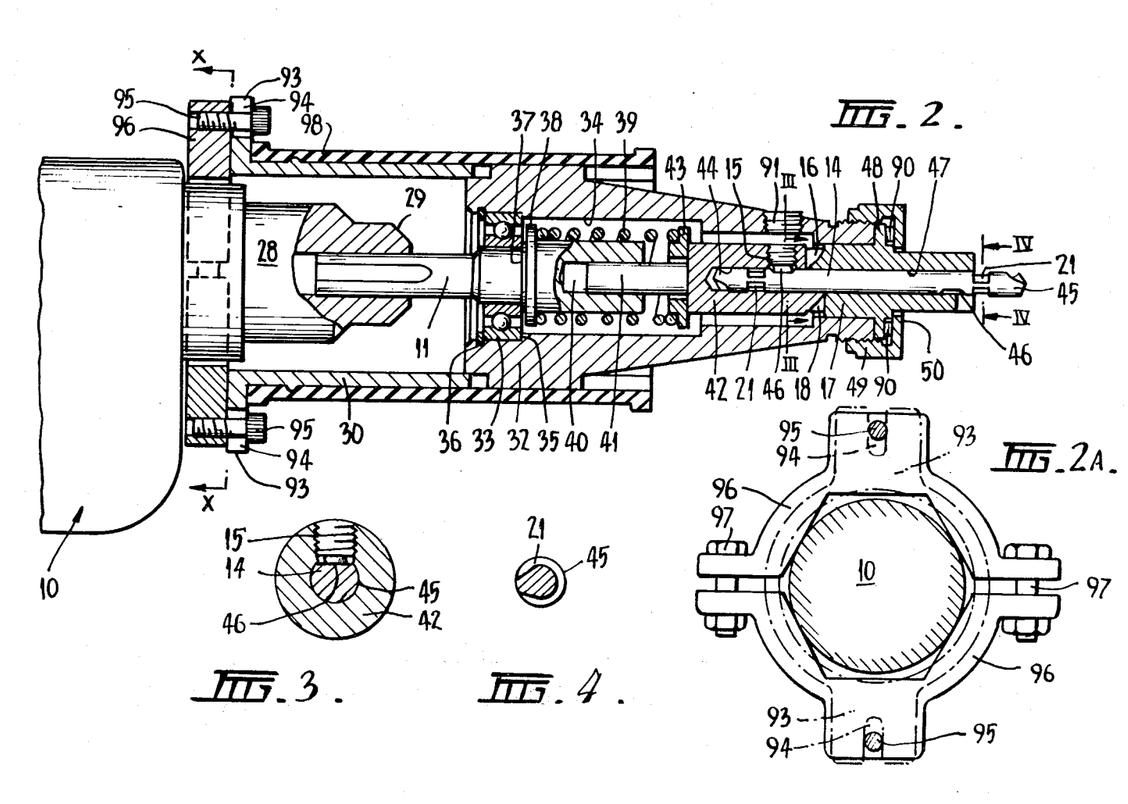
FIG. 2 is a side elevation and partly sectioned view of a second preferred embodiment according to the present invention.
FIG. 2A is a section view taken along line X—X of FIG. 2.
FIG. 3 is a cross-sectional view taken along line III—III of FIG. 2.
FIG. 4 is a cross-sectional view taken along line IV—IV of FIG. 2.

The arrangement shown in FIG. 2 and described hereinafter illustrates an embodiment which substantially overcomes the transmission of reciprocating forces to the operator. It should be appreciated that although FIG. 2 illustrates an attachment for a drill unit, the apparatus may be formed as an independent unit having its own rotary drive means.

Referring to FIG. 2, there is again shown part of a drill unit 10 having a chuck 28 with jaws 29. An adaptor body 30 of generally hollow cylindrical configuration is mounted co-axially around the drill bearing boss. The cylindrical adaptor body 30 includes a pair of diametrically opposed flanges 93 with radial slots 94, each of the slots being adapted to receive a spigot 95 of an adjustable V clamp which is applied to the drill bearing boss. The V clamp as shown in FIG. 2A is formed in two parts 96 such that when they are joined by screw fasteners 97 and engaged against the drill bearing boss, they form an internal hexagonal opening clamped against the boss.

Furthermore, the adaptor body may be surrounded by a cover sleeve 98 of plastics material retained axially thereon by a groove in the adapter body and a matching internal circumferential rib in the cover sleeve. The cover sleeve is adapted to protect the operator and also to assist in holding the tool close to the working zone for precise guiding. The sleeve is free to rotate so that it is not necessary to rotate the hand when holding the tool.

The drive shaft 11 of the nibbling arrangement is releasably secured within the jaws 29 with the other end thereof extending into a housing part 32 and supported therein by a bearing (suitably a deep groove ball bearing) 33 mounted within the housing part 32. The housing part 32 is received within the outer end of the adapter body 30 and includes an internal stepped bore 34. The outer race of the bearing 33 is secured against a shoulder 35 within the bore 34 by means of an internal circlip 36. The inner race of the bearing 33 surrounds the drive shaft 11 and abuts a shoulder 37 on the shaft 11. The drive shaft includes a rim or washer 38 of increased diameter inwardly of the bore 34 relative to the bearing 33 which acts as a seat for a helical compression spring 39 arranged co-axially around the drive shaft 11. Finally the free end of the drive shaft 11 includes an axially extending internal bore 40 adapted to slidably receive a spigot portion 41 of a cam follower 42 while preventing relative rotation therebetween. Preferably the bore 40 has a non-circular cross-section such as square, hexagonal or splined section and the spigot portion 41 has a corresponding co-operating section.

The housing part 32 further includes within its bore 34, a spring abutment washer 43 which abuts the cam follower 42 and surrounds the spigot portion 41. In this way the compression spring 39 provides a resilient force urging the drive shaft 11 and the cam follower 42 apart. The cam follower 42 also has an internal axial bore 44 receiving a cutting element 14 comprising double ended double fluted drill stem 45 which is secured therein for axial and rotary movement with the cam follower 42 by means of a set screw 15 engaging with a flat 46 formed on the drill stem 45. The double ended nature of the drill stem allows for easy reversal of the drill element to minimize the number of drill elements that may be required in the event of wear or damage. The drill element 45 is further passed through an internal bore 47 of a stationary shearing sleeve 17 which is held in position within the bore 34 of the housing part 32 at its free end. This is achieved by means of a laterally extending abutment 48 on the shearing sleeve engaging with the free end of the housing part 32 and being held there by a screwed retaining nut 49 engaging against a shoulder 50 of the shearing sleeve. An external toothed lock washer 90 is positioned between the nut 49 and the shearing sleeve 17 to prevent unintentional loosening of the nut due to operational vibrations. However, removal and interchange of various parts of the assembly may be achieved by removing the retaining nut 49. Both the shearing sleeve 17 and the cam follower 42 include interengaging cam means 16, 18 respectively whereby upon rotation of the cam follower 42 a reciprocating movement is also imposed thereon. Further details of the operation of the drill element 45, the shearing sleeve 17 and the cam follower 42 will be provided in the following with reference to FIGS. 3 to 9.

Figure 8:
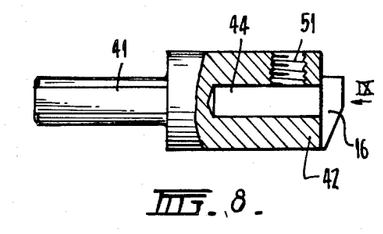
FIG. 8 is a longitudinal cross-sectional view of the cam follower illustrated in FIG. 2.
Figure 9:
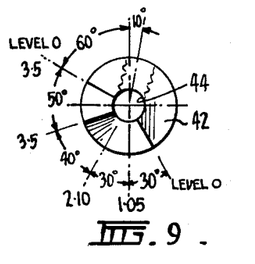
FIG. 9 is a detailed end elevation view of the cam follower of FIG. 8 viewed in direction IX.

Referring first to FIG. 8 there is shown the cam follower 42 with a hexagonal (in cross-section) axially extending spigot 41 capable of relative axial sliding movement within bore 40 of the drive shaft 11 but being held for rotation therewith. At the other end of the follower 42, the axial bore 44 for receiving and securing the drill element 45 is provided together with an axially protruding cam surface 16. Suitable angular positions and the relative levels (given in mm) of the surface at these positions are shown in the end elevation view of FIG. 9. It should however be appreciated that the numerical values identified are merely illustrative, and significant variations therefrom may be provided in suitable applications.

Figures 5, 6:
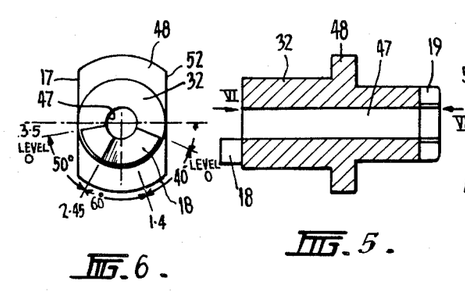
FIG. 5 is a longitudinal cross-sectional view of the shearing sleeve illustrated in FIG. 2.
FIG. 6 is a detailed end elevation view of the shearing sleeve of FIG. 5 viewed in direction VI.

There is also provided a threaded transverse bore 51 for the set screw 15 which is adapted to secure the drill element in the follower 42. In FIG. 5 there is shown a detailed cross-sectional elevation view of the shearing sleeve 17. This sleeve has at one axial end, a cam surface 18 cooperable with the cam surface 16 of the follower 42. The relative angular positions and levels (given in mm) of the cam surface 16 are shown in FIG. 5 and again it should be appreciated that these are merely illustrative. It will be seen from FIGS. 6 and 7 that the shearing sleeve has two axially flat surfaces 52 which are adapted to engage with corresponding abutment surfaces of the housing part 32 to prevent rotation of the sleeve 17. Thus movement of the sleeve 17 is prevented in an axial direction by the retaining nut 49 and external toothed lock washer 90 and rotationally by the surfaces 52.

Figure 7:
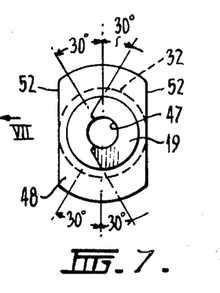
FIG. 7 is a detailed end elevation view of the shearing sleeve of FIG. 5 viewed in direction VII.

FIGS. 2 and 4 of the accompanying drawings illustrate the drill element 45 and the shearing slot 21. The shearing slot 21 comprises a groove formed into the stem and extending substantially (but not completely) around the periphery of the stem. The groove is arranged adjacent to but spaced axially from the drill point and has, in cross-section, a truncated tear drop shape as shown in FIG. 4. This shape results in good steering and minimizes any scalloping effect on the slot cut. The location of the shearing slot 21 is such that in operation it will reciprocate past the end of the shearing sleeve 17 which is formed by shear face 19. The shear face 19 (as best shown in FIG. 7) is stepped to form a chip clearance notch 20 whereby cut chips of the sheet material can easily escape on rotation of the cutting element 14. In arrangements where the element 14 is continually rotating the clearance notch 20 usually extends over an angle of less than 180° to ensure that a slot is cut having a full width equivalent to the diameter of the cutting element 14. As shown in FIG. 7 the clearance notch extends over an angle of about 120°.

As shown in FIG. 2, the adapter body 30 includes slots at its outer or free end which engage with suitable lugs on the main housing part 32 which enables reasonably easy connection and release of these parts as desired. Furthermore, the housing part 32 substantially encloses all the working parts of the apparatus thereby enabling packing of these parts with a combined cutting and lubricating compound.

The lubricant could be supplied through a specific opening in the wall of the housing part 32 which is closed by a screw plug 91. Removal of the screw plug 91 also enables access to the set screw 15 holding the drill element 45 in the cam follower 42. This may be required for maintenance of the apparatus. Alternatively, the lubricant might be supplied by removal of the retaining nut 49 together with the shearing sleeve 17 and cam follower 42 assembly. In use, the lubricant will work its way out through the clearance between the drill element 45 and the shearing sleeve 17 to lubricate the nibbling action during cutting of the sheet material.

Operation of the apparatus is generally as follows. Upon operation of the drill apparatus 10, a rotary drive force is supplied to the drive shaft 11. This rotary force is transferred via the non-circular spigot 41 to the cam follower 42. The cam follower is urged by the spring 39 against the stationary cam surface 18 of the shearing sleeve 17. In consequence of this, the cam follower, and of course the drill element 45 secured thereto, rotates and reciprocates relative to the stationary shearing sleeve 17 with the spigot 41 sliding inside the bore 40 of the drive shaft 11. It will be appreciated that the cam surfaces 16 and 18 (best illustrated in FIGS. 6 and 9) have portions of sudden change whereby a quick shearing action reciprocation is imposed on the drill element 45 forcing the shearing slot 21 past the shear face 19.

Figure 12A:
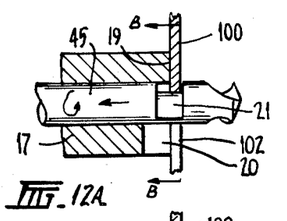
FIGS. 12A to 12F are simplified partial section views of the cutting elements illustrated in the aforementioned drawings showing the cutting action of the elements in association with sheet material.
Figure 12B:
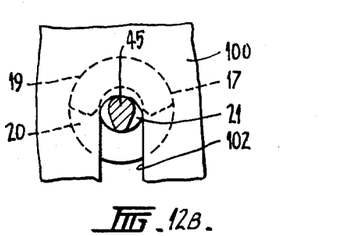
Figure 12C:
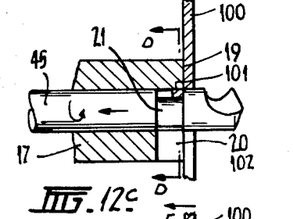
Figure 12D:
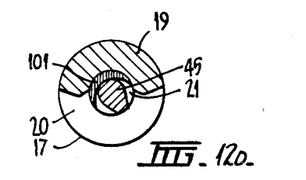
Figure 12E:
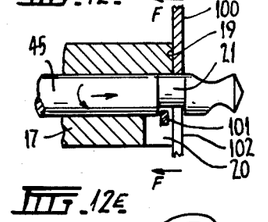
Figure 12F:
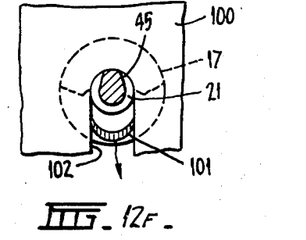

FIGS. 12A to 12F of the accompanying drawings illustrate, in a simplified manner, the cutting action of apparatus in accordance with the previously described arrangements (except in relation to FIGS. 13, 14, and 15). FIG. 12B is a section view taken along line B—B of FIG. 12A; FIG. 12D is a section view taken along line D—D of FIG. 12C; and FIG. 12F is a section view taken along line F—F of FIG. 12E.

In the figures the direction of movement of the drill element 45 is shown by the indication arrows. The drill element 45 is rotating counter clockwise while at the same time it is reciprocating axially relative to the shearing sleeve 17.

FIG. 12A illustrates in a partial longitudinal section view, the relative positions of the drill element 45, the shearing sleeve 17 and the sheet material 100 prior to a shearing cut being made. At this position the drill point is located extending laterally through the slot 102 (previously cut) and the forward edge of the slot is located within the groove 21 in the drill element 45. Upon downward movement of the element 45, the edge of the slot 101 is engaged by the groove 21 and sheared off to form a chip 101 as shown in FIG. 12C. The cut or sheared chip 101 is then carried within the groove 21 as the drill element rotates to a position as illustrated in FIG. 12E approximately 180° in advance of the position shown in FIG. 12A. As shown in FIGS. 12E and 12F, the chip 101 has reached the clearance notch 20 and thrown outwardly through the notch 20. Continued rotation and axially upward movement of the drill element 45 carries the element to a position as shown in FIG. 12A ready to repeat the cutting operation.

To create the initial starting hole from which the slot 102 extends (or in fact any other location hole), the drill point of the drill element 45 is used by applying axial pressure thereto. This axial pressure will initially move the drill member 45 and the cam follower axially (to the left as shown in FIG. 2) thus disengaging the cam surfaces 16, 18. Continued pressure results in the washer 43 engaging the free end of the drive shaft 11 which enables the drill member 45 to rotate in a conventional manner without reciprocation.

This is possible provided that sufficient axial pressure is maintained to overcome the force of the spring 39 which urges the cam surfaces 16, 18 towards a position of mutual engagement. It should also be mentioned that the drill member (after drilling of the initial hole) may be replaced by a member without a drill point and only a short axial length beyond the shearing slot 21. This is of particular advantage where the space beyond the sheet material being cut is limited.

Figure 10:
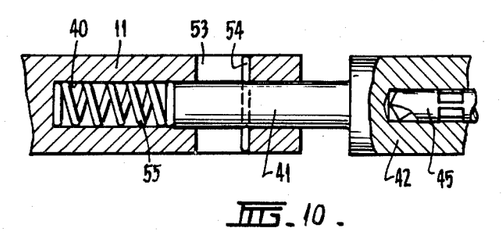
FIG. 10 is a side view in section showing an alternative embodiment of a part of the arrangement illustrated in FIG. 2.

FIG. 10 illustrates an alternative method of connecting the cam follower 42 to the drive shaft 11. In this arrangement, the spigot portion 41 slides within the bore 40 in the drive shaft 11. A helical compression spring 55 is located within the bore 40 and provides a resilient force urging the cam follower 42 to the right in FIG. 10. This force tends to urge the cam faces 16 and 18 together. An axial slot 53 is formed in the shaft 11 extending diametrically therethrough and a transverse pin 54 secured to the spigot 41 slides within the slot 53. This arrangement enables the spigot 41 to slide axially relative to the shaft 11 but ensures that the spigot 41 and cam follower 42 rotates with the drive shaft 11.

Figure 11:
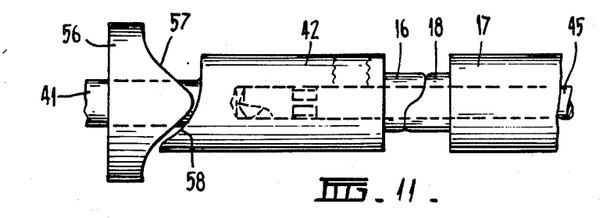
FIG. 11 is a side view showing a further alternative embodiment of a part of the arrangements illustrated in the aforementioned drawings.

FIG. 11 of the accompanying drawings further illustrates an alternative embodiment of part of the previously described arrangements. In this arrangement the compression springs 39, 55 of FIGS. 2 and 10 are replaced by an additional cam system comprising a stationary cam member 56 surrounding the spigot 41 of the cam member 42. The cam member 56 includes a cam surface 57 engagable with a corresponding cam surface 58 on the cam follower 42. Again, as with the previously described embodiments, the spigot 41 rotates with the drive shaft 11. This arrangement has the advantage that a more positive reciprocating motion is applied in both directions and prevents the possibility of the drill element sticking in the shearing sleeve, however, it does have the disadvantage that it is not possible to prevent reciprocation of the drill member 45 when it is operating in the drilling mode.

Referring to FIG. 13, there is illustrated a simple further preferred embodiment wherein the relatively reciprocating parts are not also relatively rotating. This arrangement increases the potential life of the shearing surfaces and in addition improves the steerability of the device. On larger diameters, a rotational velocity component of the shearing surfaces can have an adverse effect on the steering of the device.

The device shown in FIG. 13 comprises a drive shaft 11 adapted to be secured in the chuck of a drill unit (not shown). The drive shaft 11 extends axially through the device and terminates at its free end in a drill point 22. The drill point 22 is of increased diameter relative to the remainder of the drive shaft 11 and a cam face 59 is formed at the transition between the respective diameters. A generally cylindrical cutting element 14 is slidably arranged on the drive shaft 11 and includes an annular cam face 60 at one end co-operating with the cam face 59. A generally stationary cylindrical shearing sleeve 17 co-axial with the shaft 11 is located therearound and is secured to a steering arm 23. Alternatively, the shearing sleeve 17 may be secured within a housing part as illustrated in FIG. 2. One end of the shearing sleeve 17 forms a shearing face 19 and a chip clearance aperture 61 of generally rectangular configuration is arranged adjacent to but spaced from the face 19. A transverse shearing slot 21 is located in the cutting element 14. Furthermore, the cutting element 14 includes a longitudinally extending guide-way 62 engagable with a key 63 secured within the shearing sleeve 17. This arrangement ensures that the cutting element 14 may slide axially within the sleeve 17 but that these two parts are restrained from relative rotation. A helical compression spring 64 engages between a circlip 65 and abutment washer 66 and the cutting element 14 thereby urging the cam surfaces 59 and 60 into interengagement. Finally, a cylindrical abutment collar 67 is secured to the drive shaft 11 by means of a set screw, against which the stationary shearing sleeve 17 bears.

FIG. 14 illustrates an arrangement essentially similar to that of FIG. 13 except that the spring 64 has been replaced by a second pair of cam surfaces adapted to provide positive engagement between the cam surfaces 59, 60. In this embodiment the abutment collar 67 includes a cam face 68 engaging a cam face 69 on the cutting element 14 opposite to the cam surface 60.

The operation of both the embodiments of FIGS. 13 and 14 is generally as follows. The drive shaft 11 is rotated via the drill unit and an initial hole is drilled by use of the drill point 22. Rotation of the shaft 11 also rotates the cam face 59 which imposes a reciprocating motion on the cutting element 14. As a result of this, the shearing slot 21 reciprocates past the shearing face 19 such that the edges of the initially drilled hole are removed via the chip clearance aperture 61 by a shearing or nibbling action.

Figures 15, 15A:
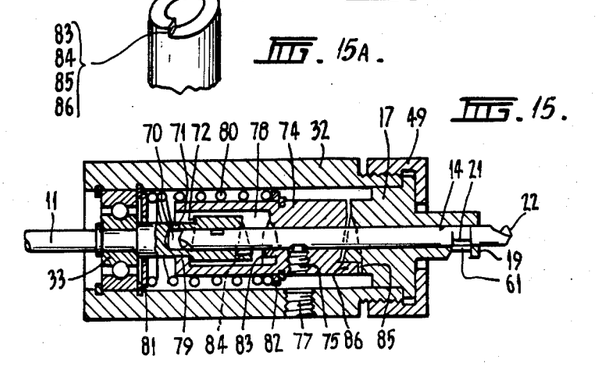
FIG. 15 is a side elevation and partly sectioned view of a fifth preferred embodiment according to the present invention.
FIG. 15A is a perspective view of a positive angular engagement part shown in FIG. 14.

Referring now to FIG. 15, there is shown an arrangement such that when it is used in the drilling mode of operation axial pressure applied to the drill positively engages the drill for rotation, whereas releasing this pressure for the nibbling mode of operation disengages the rotation and fixes the cutting element in the correct angular position for nibbling without rotation. The arrangement shown in FIG. 15 comprises a generally cylindrical housing part 32 which may be restrained in a similar manner to the housing 32 of FIG. 2 and a shearing sleeve 17 secured to the forward end of the housing part 32 by a retaining nut 49. As in the embodiments of FIGS. 13 and 14, the sleeve 17 includes a forwardly extending cylindrical part having a shearing face 19 and a substantially rectangular chip clearance opening 61 spaced rearwardly therefrom. A cutting element 14 having a drill point 22 at either end passes axially through the shearing sleeve 17 and a transverse shearing slot 21 is associated with each drill point 22 and is adapted to co-operate with the shearing face 19 of the sleeve 17.

Arranged at the end of the housing part 32 opposite to the nut 49 is a drive shaft 11 supported co-axially within the part 32 by a bearing 33 retained in position by suitably located circlips. The drive shaft 11 is either adapted for insertion in the chuck of a conventional drill unit or may be connected to a rotary drive means when this apparatus is formed as an independent unit. The drive shaft 11 is formed with an axially extending bore 70 adapted to receive the cutting element 14 in slidable or rotational relation and a transverse breather hole 71 adjacent the closed end of the bore 70 for preventing blockages created by retained oil in the blind end of the bore. The end of the drive shaft surrounding the bore 70 has an increased outer diameter relative to the remainder of the shaft whereby an annular cam face 72 is formed facing axially towards the bearing 33.

Arranged between the shaft 11 and the shearing sleeve 17 is an intermediate member 74 having a central bore through which the cutting element 14 passes. The cutting element 14 is releasably secured to the intermediate member 74 by a transverse set screw 75 engaging in a recess 76 in the cutting element. A transverse access opening and screw plug 77 is provided in the housing part 32 to enable access to the set screw 75 which in turn enables easy replacement of the cutting element 14. The access opening may also be used for filling the housing part with lubricant.

The intermediate member 74 is formed with an axially extending bore 78 opening towards the bearing 33 and into which the increased diameter of the drive shaft 11 extends. A cylindrical peg cam follower 79 extending inwardly from the periphery of the member 74 into the bore 78 and engages with the cam face 72 of shaft 11. A compression spring 80 is located within the housing part 32 generally surrounding the intermediate member 74 and extending between abutment washers 81, 82, respectively engaging the housing part 32 and member 74 to urge the cam face 72 and follower 79 into mutual interengagement.

Furthermore, the blind end of bore 78 and the forward end of drive shaft 11 are formed with positive rotary drive surfaces comprising axially extending flats 83, 84 respectively, and helical annular surfaces joining the top and bottom of the flats. This arrangement allows a smooth engagement of the respective flats according to the axial pressure which may be applied to the forward point 22 of the cutting element 14. Similar positive locating surfaces comprising an axially extending flats stationary flat 85 and a co-operating flat 86 are respectively provided on the rearwardly facing end of the shearing sleeve 17 and the forwardly facing end of the intermediate member 74. The general shape of the surfaces 83, 84, 85 and 86 are shown in detail in FIG. 15A.

Operation of the previously described arrangement is generally as follows.

In the drilling mode of operation, axial pressure applied to the drill point 22 of the cutting element 14 compresses the spring 80 thereby causing the intermediate member 74 and the cutting element 14 to move rearwardly so that the axial flat 83 engages the flat 84 on the drive shaft 11. This consequently results in the cutting element 14 rotating but not reciprocating as the cam follower 79 also is moved away from cam 72.

When axial pressure is released as the tool moves from the drilling mode to the nibbling mode of operation the axial flat faces 83, 84 disengage and the surfaces 85, 86 engage with each other by action of the spring 80. As the shearing sleeve 17 and therefore surface 85 is stationary, the engagement of faces 85, 86 prevent rotation of the cutting element 14. At the same time as the intermediate member 74 moves forwardly, the follower 79 engages the cam face 72. As a result of the axial thrust of the spring 80, the cam follower 79 is maintained in engagement with the cam face 72 causing the cutting element 14 to reciprocate but without rotation due to the engagement of the axial flat faces 85, 86.

One significant advantage of the sheet material cutting apparatus in accordance with the present invention resides in the fact that the shearing slot 21 in the cutting element co-operating with the shear face 19 is not, in the cutting region, surrounded by a body or any other obstruction whereby in effect the periphery of the drill stem defines the edges of a relatively thin slot cut by the tool. By this arrangement, the extended end of the drill element can be used to guide the tool accurately particularly where some form of frame structure exists behind (or in fact in front of) the sheet metal being cut. A typical application is for example, in the cutting out of vehicle windows or trimming sheet metal walls of a vehicle where the material may be cut around an existing frame. Alternatively, it is also possible to use artificial guide means such as metal straight edges, squares, angles, hole guides or shaped templates to guide the tool in any desired pattern. When cutting out circular openings from sheet metal, it is possible to use the drill member to cut an initial locating hole for a radius attachment. The radius attachment may include an adjustable spigot on the radius or steering arm having a conical shoulder adapted for location in the initially drilled hole. The other end of the radius attachment may be connected to the nibbling tool to guide the tool in an accurate circle. The conical shoulder in the spigot allows tilting of the nibbler as may be required when cutting openings in corrugated or curved surfaces. In an alternative embodiment to allow angular manipulation in any direction, the radius arm may be replaced by a flexible cable with a ball joint connecting the cable to the collar which is mounted to the tool.

I claim:

1. A device for cutting sheet material comprising: a cutter having rotatable hole cutting means at one end thereof for creating an initial opening in said sheet material and a cutting edge transverse to the axis of rotation of said hole cutting means, said transverse cutting edge being arranged axially spaced from said hole cutting means; and said device further including an element cooperable with said transverse cutting edge, said element and said transverse cutting edge being relatively reciprocable whereby, in use, said transverse cutting edge engages with an edge of said sheet material to remove material therefrom.

2. A device according to claim 1 wherein said element is formed as a sleeve member which at least partially surrounds said cutter, said sleeve member being held substantially stationary whereby, in use, said transverse cutting edge reciprocates past a free end region of said stationary sleeve member to effect removal of material from the sheet material edge.

3. A device according to claim 2 wherein said cutter includes a sleeve element mounted for sliding movement on a rotatable shaft, and said hole cutting means comprises a drill point on said rotatable shaft, said transverse cutting edge being formed by a recess in the outer periphery of said sleeve element and said sleeve element having a diameter equal to or less than the major diameter of said drill point.

4. A device according to claim 3 wherein said rotatable shaft includes a stepped diameter region having an axially facing cam surface, said sleeve element also having an axially facing cam surface on one end thereof arranged for engagement with the cam surface on said shaft, means for preventing rotation of said sleeve element, and means for maintaining engagement of said cam surface whereby upon rotation of said shaft said second sleeve reciprocates relative to said stationary sleeve member.

5. A device according to claim 2 which further includes a chip clearance aperture extending through said stationary sleeve member at a position extending from or spaced from said free end region and in the path of movement of said transverse cutting edge.

6. A device according to claim 2 wherein said cutter comprises a rotatable shaft with a drill point forming said hole cutting means, and said transverse cutting edge being formed by a recess in the outer periphery of the rotatable shaft.

7. A device according to claim 6 which further includes cam means operable between said stationary sleeve member and said cutter to effect relative reciprocation between said stationary sleeve member and said rotatable shaft upon rotation of said rotatable shaft.

8. A device according to claim 7 which further includes resilient biasing means to urge said cam means towards a position of interengagement.

9. A device according to claim 7 wherein said cutter includes a drive shaft interengageable with said rotatable shaft whereby said rotatable shaft is restrained for rotation with said drive shaft but is axially movable relative thereto to disengage said cam means.

10. A device according to claim 6 wherein said free end region of said stationary sleeve member includes an axially extending protrusion forming a shearing face cooperable with said transverse cutting edge, said protrusion occupying more than 180° of the periphery of the stationary sleeve member whereby the remainder of said periphery forms a chip clearance region.

11. A device for cutting sheet material according to claim 2 which further includes rotary drive means connectable directly or indirectly with said cutter to effect rotation thereof, said rotary drive means being adapted for connection to a power source.

12. A device for cutting sheet material according to claim 2 wherein said cutter is adapted for direct or indirect connection which chuck jaws of a rotary drill unit to provide rotation of said cutter.

13. A device for cutting sheet material comprising: cutter apparatus adapted to releasably secure a cutter having rotatable hole cutting means at one end thereof for creating an initial opening in said sheet material and a cutting edge transverse to the axis of rotation of said hole cutting means, said transverse cutting edge being arranged axially spaced from said hole cutting means; and said device further including an element cooperable with said transverse cutting edge, said element and said transverse cutting edge being relatively reciprocable whereby, in use, said transverse cutting edge engages with an edge of said sheet material to remove material therefrom.

14. A device adapted for cutting sheet material comprising:
(a) a drive shaft adapted for connection with drive means whereby said drive shaft is rotatable;
(b) cutting tool means connected for rotation with said drive shaft but being axially slidable relative thereto, said cutting tool means having an elongated shank region, a drill point at a free end of said shank region and a recess formed in the periphery of said shank region forming at least one transverse cutting edge axially spaced from the drill point;
(c) a sleeve member having an axially extending bore adapted to receive the shank region of said cutting tool means, such that the drill point extends beyond the free end region of said sleeve member, and said sleeve member being adapted to be held substantially stationary relative to said cutting tool means;

(d) cam means operable between said sleeve member and said cutting tool means to effect reciprocation of said tool means upon rotation thereof whereby said cutting edge or edges reciprocate past the free end region of the sleeve member; and (e) resilient biasing means urging said cam means into interengagement but enabling disengagement of said cam means upon a predetermined axial load being applied to the drill point of said cutting tool means whereby said drill point is adapted for rotation without axial reciprocation.

15. A device adapted for cutting sheet material comprising:

(a) a drive shaft adapted for connection with drive means whereby said drive shaft is rotatable;

(b) a cutting tool holder connected for rotation with said drive shaft but being axially slidable relative thereto, said cutting tool holder being adapted to releasably secure a cutting tool for movement with said holder, said cutting tool having an elongated shank, a drill point at a free end of said shank and a recess formed in the periphery of said shank forming at least one transverse cutting edge axially spaced from the drill point;

(c) a sleeve member having an axially extending bore adapted to receive said cutting tool such that the drill point extends beyond a free end region of said sleeve member and said sleeve member being adapted to be held substantially stationary relative to said tool holder;

(d) cam means operable between said sleeve member and said tool holder to effect reciprocation of said holder upon rotation thereof whereby said cutting edge or edges reciprocate past the free end region of the sleeve member; and (e) resilient biasing means urging said cam means into interengagement but enabling disengagement of said cam means upon a predetermined axial pressure being applied to said cutting tool whereby said drill point is adapted for rotation without axial reciprocation.

16. A device adapted for cutting sheet material comprising:

(a) a support body;

(b) a drive shaft adapted for connection with drive means whereby said drive shaft is rotatable;

(c) cutting tool means arranged for movement relative to said drive shaft between a first position where said cutting tool means is rotatable without reciprocation with said drive shaft and a second position where said cutting tool means is disengaged from rotation for reciprocation only, said cutting tool means having an elongated shank region, a drill point at a free end of said shank region and a recess formed in the periphery of said shank region forming at least one transverse cutting edge axially spaced from the drill point;

(d) a sleeve member having an axially extending bore adapted to receive the shank region of said cutting tool means such that the drill point extends beyond a free end region of said sleeve member, said sleeve member being adapted to be held substantially stationary relative to said support body;

(e) cam means operable between said drive shaft and said cutting tool means to effect reciprocation without rotation of said cutting tool means upon rotation of said drive shaft;

(f) first positive engagement surfaces cooperable between said sleeve member and said cutting tool means being operable, when engaged, to restrain said cutting tool means for axial reciprocation without rotation relative to said sleeve member; and (g) resilient biasing means urging said cam means and said first positive engagement surfaces into interengagement but enabling disengagement of said cam means and said first positive engagement surfaces upon a predetermined axial load being applied to the drill point of said cutting tool means whereby said cutting tool means is movable to said first position.

17. A device according to claim 16 wherein said cutting tool means includes an intermediate region having a diameter greater than that of the elongated shank region and spaced axially rearwardly from said drill point beyond the recess forming a transverse cutting edge, said intermediate region having a rearwardly directed axial engagement surface arranged to engage with a cooperating second axial engagement surface on the forward end of said drive shaft when said cutting tool means is moved to said first position and said first positive engagement surfaces are disengaged for rotation without reciprocation.

18. A device according to claim 17 wherein said cam means operable between the drive shaft and said cutting tool means comprises a cam follower formed on an axial rearwardly extending projection of said intermediate region and an annular cam surface on said drive shaft.

19. A device according to claim 17 wherein said elongated shank region of the cutting tool means passes axially through the intermediate region and is releasably secured thereto, the end of said elongated shank region opposite to said drill point being received to allow relative motion in an axial bore of said drive shaft.

* * * * *